United States Patent
Urakawa et al.

(10) Patent No.: US 7,725,458 B2
(45) Date of Patent: May 25, 2010

(54) ACCESS CONTROL SYSTEM AND ACCESS CONTROL METHOD

(75) Inventors: Yasutaka Urakawa, Yokohama (JP); Masanori Fujita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 277 days.

(21) Appl. No.: 11/087,295

(22) Filed: Mar. 22, 2005

(65) Prior Publication Data

US 2005/0216467 A1 Sep. 29, 2005

(30) Foreign Application Priority Data

Mar. 23, 2004 (JP) ............................. P2004-085391

(51) Int. Cl.
*G06F 7/00* (2006.01)
(52) U.S. Cl. ..................................................... 707/716
(58) Field of Classification Search .............. 707/1–10, 707/705–718
See application file for complete search history.

(56) References Cited

U.S. PATENT DOCUMENTS

| | | | | |
|---|---|---|---|---|
| 5,606,615 A * | 2/1997 | Lapointe et al. | ............. | 713/185 |
| 5,678,041 A * | 10/1997 | Baker et al. | ..................... | 707/9 |
| 5,696,898 A | 12/1997 | Baker et al. | .................... | 726/12 |
| 5,878,233 A * | 3/1999 | Schloss | ....................... | 709/225 |
| 5,999,179 A * | 12/1999 | Kekic et al. | .................. | 715/734 |
| 6,233,618 B1 * | 5/2001 | Shannon | ..................... | 709/229 |
| 6,408,336 B1 * | 6/2002 | Schneider et al. | ........... | 709/229 |
| 6,418,452 B1 * | 7/2002 | Kraft et al. | ................... | 707/200 |
| 7,308,487 B1 * | 12/2007 | Dansie et al. | ............... | 709/219 |
| 2003/0028532 A1 * | 2/2003 | Dougu et al. | .................. | 707/9 |
| 2003/0191971 A1 * | 10/2003 | Klensin et al. | ............. | 713/201 |
| 2004/0043372 A1 * | 3/2004 | Jebb et al. | .................... | 434/322 |
| 2005/0065935 A1 * | 3/2005 | Chebolu et al. | ................ | 707/9 |
| 2005/0144297 A1 * | 6/2005 | Dahlstrom et al. | .......... | 709/229 |

FOREIGN PATENT DOCUMENTS

| | | |
|---|---|---|
| GB | 2 366 888 | 3/2002 |
| JP | 2001-282797 | 10/2001 |
| JP | 2003-044441 A | 2/2003 |
| JP | 2003-256469 | 9/2003 |
| JP | 2004-013258 | 1/2004 |
| WO | WO 98/40992 A2 | 9/1998 |
| WO | WO 01/33371 A1 | 5/2001 |

* cited by examiner

*Primary Examiner*—Wilson Lee
(74) *Attorney, Agent, or Firm*—Brinks Hofer Gilson & Lione

(57) ABSTRACT

As an embodiment of the present invention, an access control system is comprised of a terminal, and a server arranged to receive an access request for access to a site and to access the site. The terminal has an access request control list holder for holding at least one of a first list of sites to which a request for access is accepted irrespective of setting of the server, and a second list of sites to which an access request for access is prohibited, and an access request controller for performing a control to add an access permit identifier or to prohibit the access request, based on the contents of the list. The server has an access request receiver, an access control list holder for holding an access control list, and an access controller for performing an access control with reference to the access control list and the access permit identifier.

8 Claims, 11 Drawing Sheets

Fig.6

```
Request-Header = User-Agent
              | If-Modified-Since
              | Pragma
              | Authorization
              | Proxy-Authorization
              | Referer
              | From
              | Accept
              | Accept-Encoding
              | Accept-Language
              ⋮
```

Fig.11

| VIOLENCE | NUDE |
|---|---|
| 0 LIMIT ALL VIOLENCE | 0 NONE |
| 1 STRUGGLE | 1 SCANTY OUTFITS |
| 2 KILLING | 2 PARTIAL NUDE |
| 3 BLOODY MURDER | 3 COMPLETE NUDITY |
| 4 BRUTAL AND EXTREME VIOLENCE | 4 PROVOCATIVE COMPLETE NUDITY | ns # ACCESS CONTROL SYSTEM AND ACCESS CONTROL METHOD

BACKGROUND OF THE INVENTION

1. Field of the Invention

The present invention relates to an access control system comprised of a terminal, and a server arranged to receive an access request for access to a site on a network from the terminal and to access the site, and the present invention relates to an access control method in the access control system.

2. Related Background Art

Presently, quite a lot of contents browsable on the Internet include contents offensive to public order and decency. One of methods of controlling display of such contents is the method by the Platform for Internet Content Selection of W3C (World Wide Web Consortium). In this method, for example, a content creator sets harmful level information on a content created thereby, based on harmful levels as shown in the table of FIG. 11. Specific setting methods thereof include, for example, a method of defining and setting a label or labels such as the "PICS-Labels" on each web page.

There is another method of controlling access, based on a black list of URLs (Uniform Resource Locators) of sites to which access is rejected, or based on a white list of only URLs of sites to which access is permitted.

The access control as described above is often performed by access control apparatus such as a proxy server. There are proposals on the technology of performing access control per individual to access contents, by such access control apparatus (e.g., reference is made to Japanese Patent Application Laid-Open No. 2003-44441).

SUMMARY OF THE INVENTION

However, when registration and management of URLs of accessible sites or conditions for access are performed per individual, it will result in increasing loads on the server performing the access control and increasing efforts of an administrator of the server.

An object of the present invention is therefore to provide an access control system and an access control method capable of reducing the loads on the server and the efforts of the administrator of the server.

In order to achieve the above object, an access control system according to the present invention is an access control system comprising a terminal, and a server for receiving an access request for access to a site on a network from the terminal and performing access to the site, wherein the terminal comprises: access request control list holding means for holding at least one of a first list of one or more sites to which a request for access is accepted irrespective of setting of the server and a second list of one or more sites to which an access request for access is prohibited; and access request controlling means for performing a control as follows: where the access request control list holding means holds the first list, the access request controlling means determines whether the access request is an access request for access to a site included in the first list; when the site is determined to be included in the first list, the access request controlling means adds an access permit identifier to the access request; where the access request control list holding means holds the second list, the access request controlling means determines whether the access request is an access request for access to a site included in the second list; when the site is determined to be included in the second list, the access request controlling means prohibits the access request; and wherein the server comprises: access request receiving means for receiving the access request from the terminal; access control list holding means for holding an access control list of one or more sites to which an access request for access is permitted or rejected; and access controlling means for making a determination on whether the access request received by the access request receiving means is accompanied by the access permit identifier, for making a determination on whether the access request is to be permitted or rejected, with reference to the access control list, and for performing an access control corresponding to the access request, based on results of the determinations.

In the access control system according to the present invention, when the terminal makes an access request for access to a site listed in the first list, the access permit identifier is added to the access request. On the other hand, when the terminal attempts to make an access request for access to a site listed in the second list, the control to prohibit the access request is carried out. The server makes a determination on whether the access request from the terminal is to be permitted or rejected, with reference to the access control list, and makes a determination on whether the access request is accompanied by the access permit identifier. The server performs the access control, based on the results of these determinations.

In this manner, the exceptional access control to the rule uniformly set by the server can be performed for each terminal, without need for individual setting in the server, whereby the loads on the server and the efforts of the administrator of the server can be reduced.

More specifically, the access control system is preferably configured so that when the access request is accompanied by the access permit identifier or when permission of access is determined based on the access control list, the access controlling means performs a control to permit access corresponding to the access request.

The present invention can also be understood as the invention of the access control method as described below, with like action and effect.

An access control method according to the present invention is an access control method in an access control system comprising a terminal holding at least one of a first list of one or more sites to which a request for access is accepted irrespective of setting of a server and a second list of one or more sites to which an access request for access is prohibited; and a server arranged to receive an access request for access to a site on a network from the terminal and to access the site and holding an access control list of one or more sites to which an access request for access is permitted or rejected, the access control method comprising: an access request controlling step wherein the terminal performs a control as follows: where the terminal holds the first list, the terminal determines whether the access request is an access request for access to a site included in the first list; when the site is determined to be included in the first list, the terminal adds an access permit identifier to the access request; where the terminal holds the second list, the terminal determines whether the access request is an access request for access to a site included in the second list; when the site is determined to be included in the second list, the terminal prohibits the access request; an access request receiving step wherein the server receives the access request from the terminal; and an access controlling step wherein the server makes a determination on whether the access request received in the access request receiving step is accompanied by the access permit identifier, the server makes a determination on whether the access request is to be permitted or rejected, with reference to the access control list, and the server performs an access control corresponding to the access request, based on results of the determinations.

More specifically, the access control method is preferably arranged so that when the access request is accompanied by the access permit identifier or when permission of access is determined based on the access control list, the server performs a control to permit access corresponding to the access request in the access controlling step.

As described above, the present invention enables the exceptional access control to the rule uniformly set by the server, for each terminal, without need for individual setting in the server, and thereby reduces the loads on the server and the efforts of the administrator of the server.

BRIEF DESCRIPTION OF THE DRAWINGS

FIG. 6 is an example of a request header field of an access request in the first mode of the embodiment.

FIG. 11 is an example of a table of harmful levels set for contents.

DESCRIPTION OF THE PREFERRED EMBODIMENTS

Embodiments of the present invention will be described below with reference to the drawings.

Figure 1:
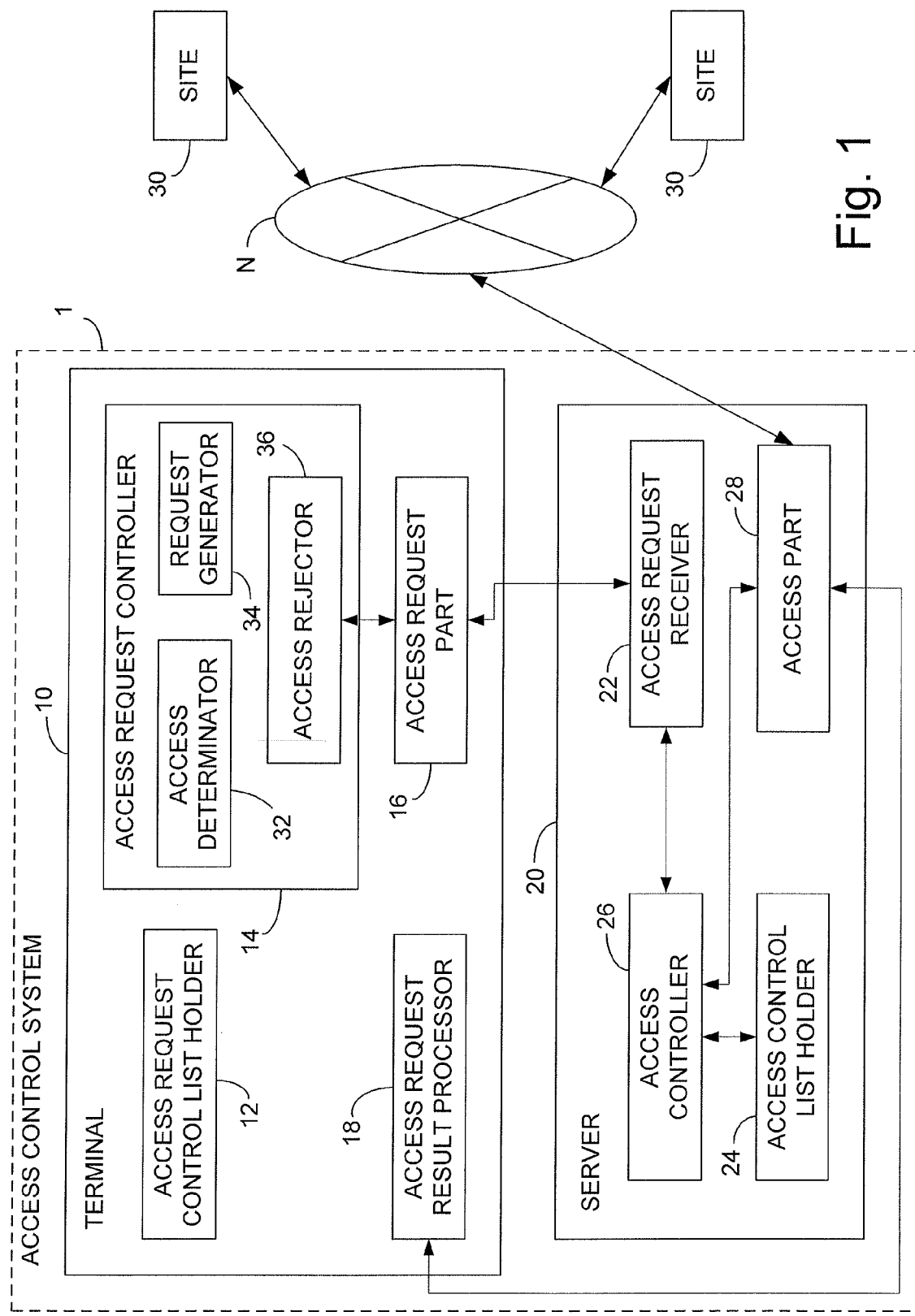
FIG. 1 is an illustration showing a configuration of an access control system according to an embodiment of the present invention.

FIG. 1 shows a configuration of access control system 1 according to the present embodiment. The access control system 1 is comprised of terminal 10 and server 20.

The terminal 10 sends an access request to the server 20 and makes access to site 30. Specifically, the terminal 10 is preferably, for example, mobile communication equipment such as a cell phone. It may also be a personal computer, a PDA (Personal Digital Assistant), or the like. The server 20 receives the access request from the terminal 10 and makes access to a plurality of sites 30 through a network N, based on the access request. Specifically, the server 20 is preferably implemented, for example, by information processing equipment consisting of a CPU, a memory and so on, or the like. Specifically, the sites 30 as access targets correspond, for example, to Web servers or the like which provide various contents. Specifically, the network N corresponds, for example, to an Internet network, a mobile telecommunications network, or the like. Although FIG. 1 shows only one terminal 10 to be connected to the server 20, a preferred configuration is such that a plurality of terminals exist.

Components of terminal 10 and server 20 will be described below. The terminal 10 is comprised of an access request control list holder 12, an access request controller 14, an access request part 16, and an access request result processor 18.

The access request control list holder 12 holds at least one of a first list of sites 30 to which a request for access is accepted irrespective of setting of the server 20, and a second list of sites 30 to which an access request for access is prohibited. These lists are preferably those specifying the sites 30 by their URLs. Alternatively, means other than URLs may also be used to specify the sites 30. The details of these lists will be described later.

The access determinator 32 of the access request controller 14 reads out the list held in the access request control list holder 12 and performs a control of the access request, based thereon. If the site is included in the second list of sites 30, the access rejector 36 of the access request controller 14 rejects access to the site. Specific control contents will be described in the description of processing of the present system.

The access request part 16 is controlled by the access request controller 14, which generates the request using request generator 34, so as to send an access request for accessing site 30, to the server 20. This access request, specifically, is preferably implemented by transmitting information of a request for access, to the server 20.

The access request result processor 18 receives result data about the access request, from the server 20 and processes it. Specific processing contents will be described later.

The server 20 is comprised of an access request receiver 22, an access control list holder 24, an access controller 26, and an access part 28.

The access request receiver 22 receives an access request from the terminal 10. This reception of the access request, specifically, is preferably carried out by receiving the information of the request for access, transmitted from the terminal 10.

The access control list holder 24 holds an access control list of sites 30 to which the received access request for access is permitted or rejected. The list is preferably one specifying sites 30 by their URLs, as the lists held in the terminal 10 are. The details of these lists will be described later.

The access controller 26 retrieves the access request received by the access request receiver 22 and the list held by the access control list holder 24, and performs a control of the access request, based thereon. Specific control contents will be described in the description of processing of the present system.

The access part 28 is controlled by the access controller 26 so as to access a site 30 through the network N.

Subsequently, each of the lists held by the terminal 10 and server 20 will be described.

The access control list of sites to which an access request for access is permitted or rejected, which is held by the access control list holder 24 of server 20, is a list for determining whether an arbitrary site is an accessible site or an inaccessible site from the server 20.

The list of sites to which an access request for access is permitted is a list of accessible sites, i.e., a so-called white list. The white list is set, for example, where a provider to provide a service of connection to the network N desires to permit access to its official sites only.

On the other hand, the list of sites to which an access request for access is rejected is a list of inaccessible sites, i.e., a so-called black list. The black list is set, for example, where a company or the like prohibits employee's access to sites remotely related to business, e.g., stock sites, adult sites, charged sites, and so on. Access is permitted to sites not listed in the black list. Only either one of the white list and the black list is normally set in order to avoid inconsistency of setting.

Figure 3:
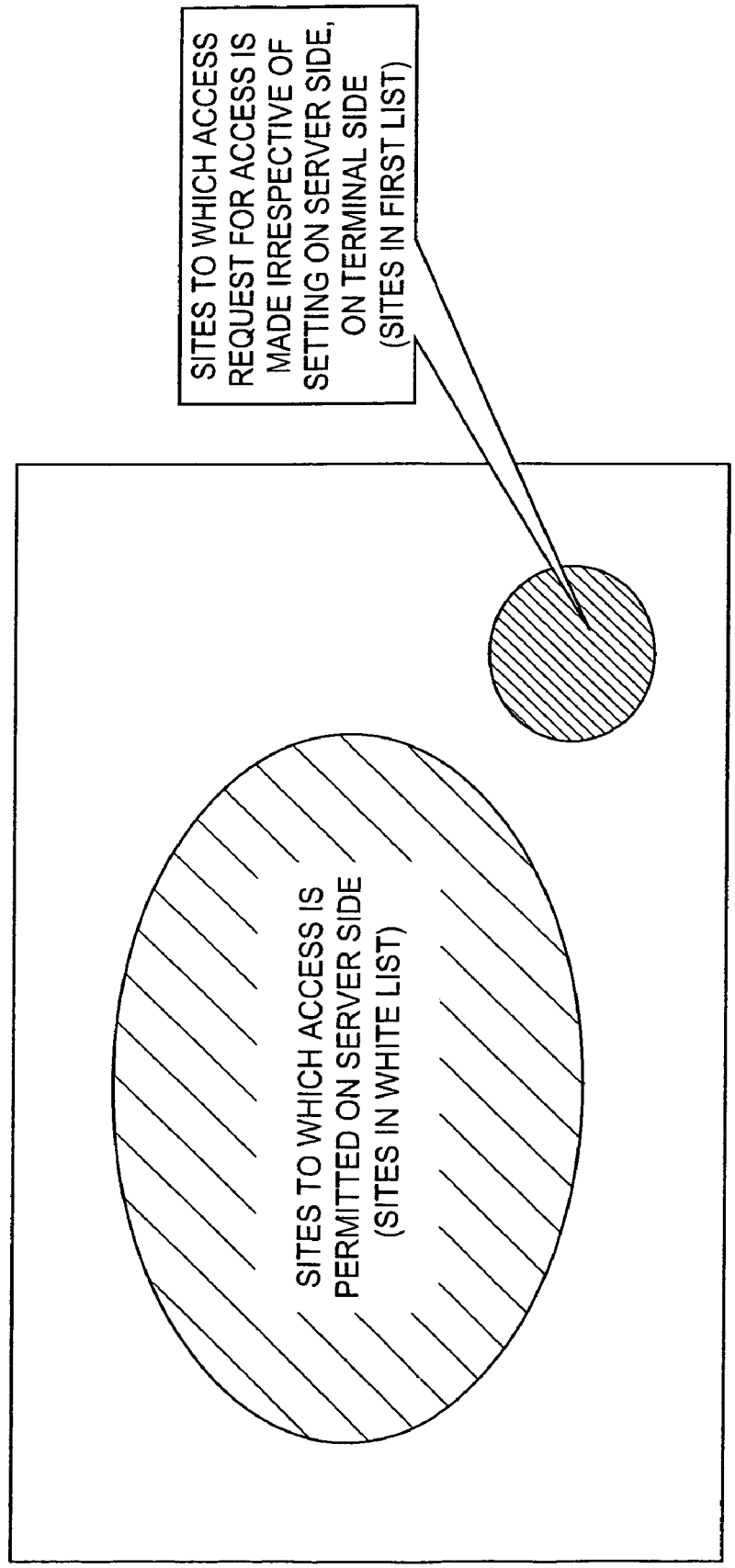
FIG. 3 is an example of sites for which an access limitation is set by a list on the terminal, and sites for which an access limitation is set on the server, in the first mode of the embodiment.
Figure 7:
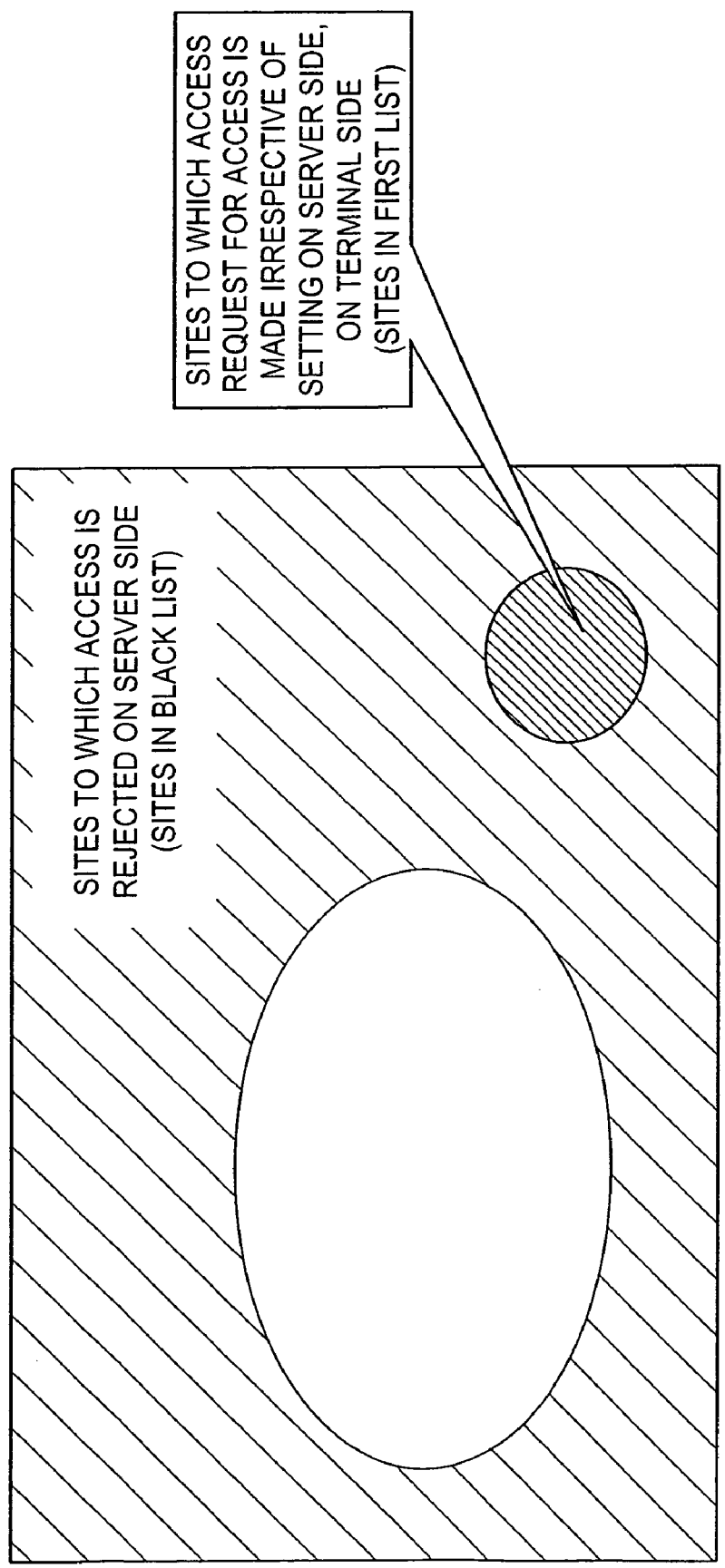
FIG. 7 is another example of sites for which an access limitation is set by a list on the terminal, and sites for which an access limitation is set on the server, in the first mode of the embodiment.

The first list held by the access request control list holder 12 of terminal 10 is a list of sites to which exceptional access is desired, irrespective of the setting of the server 20. Even sites except for the aforementioned official sites set in the white list can be set in the first list, for example, where a user wants to browse Web pages including communications, events, etc. of a school (a setting as schematically shown in FIG. 3). Another possible case is sites to which access should be rejected based on the black list but which are set in the first list, for example, where a user wants to browse Web pages necessary for acquiring information about a client (a setting as schematically shown in FIG. 7).

Figure 8:
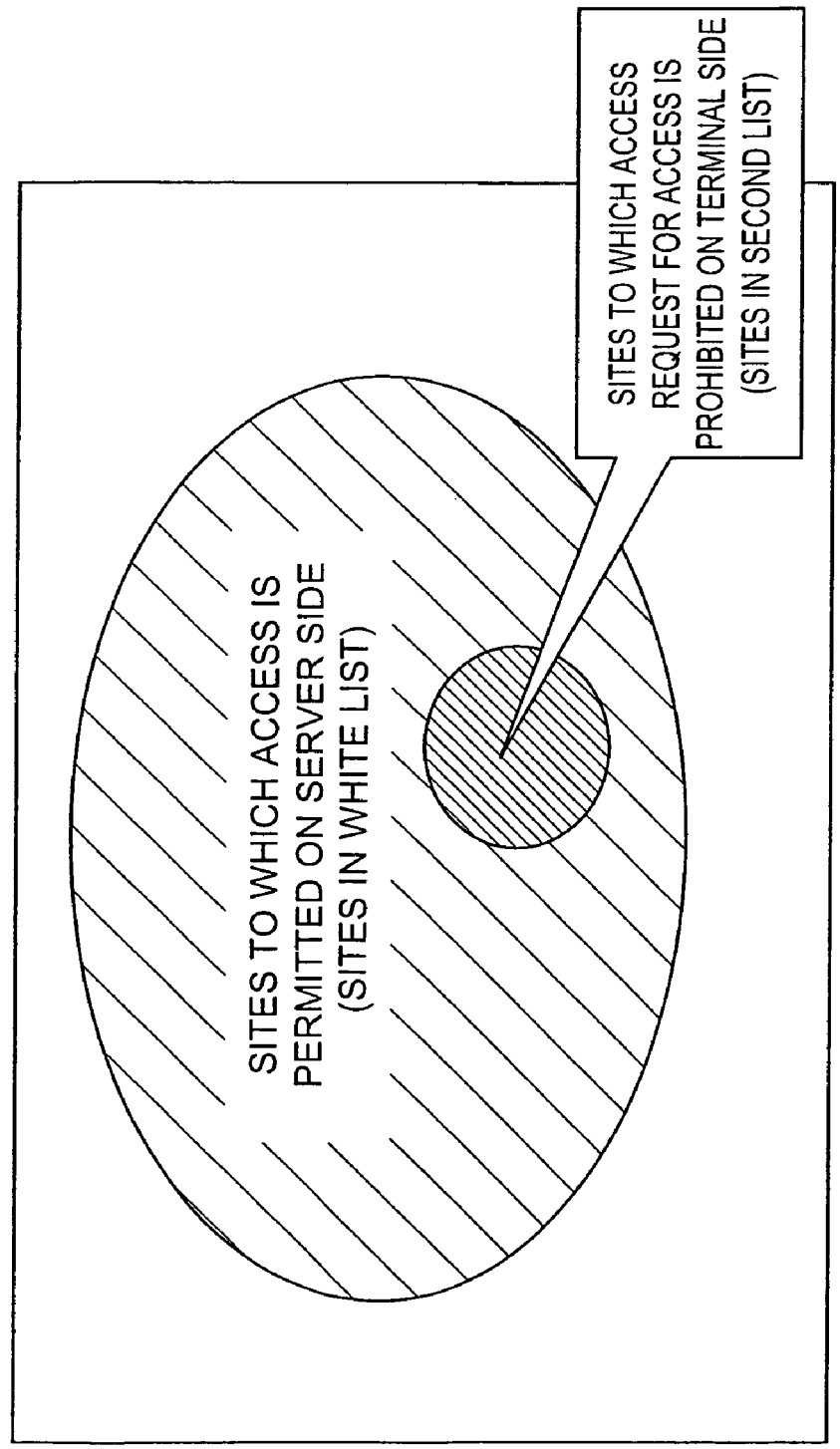
FIG. 8 is an example of sites for which an access limitation is set by a list on the terminal, and sites for which an access limitation is set on the server, in the second mode of the embodiment.
Figure 10:
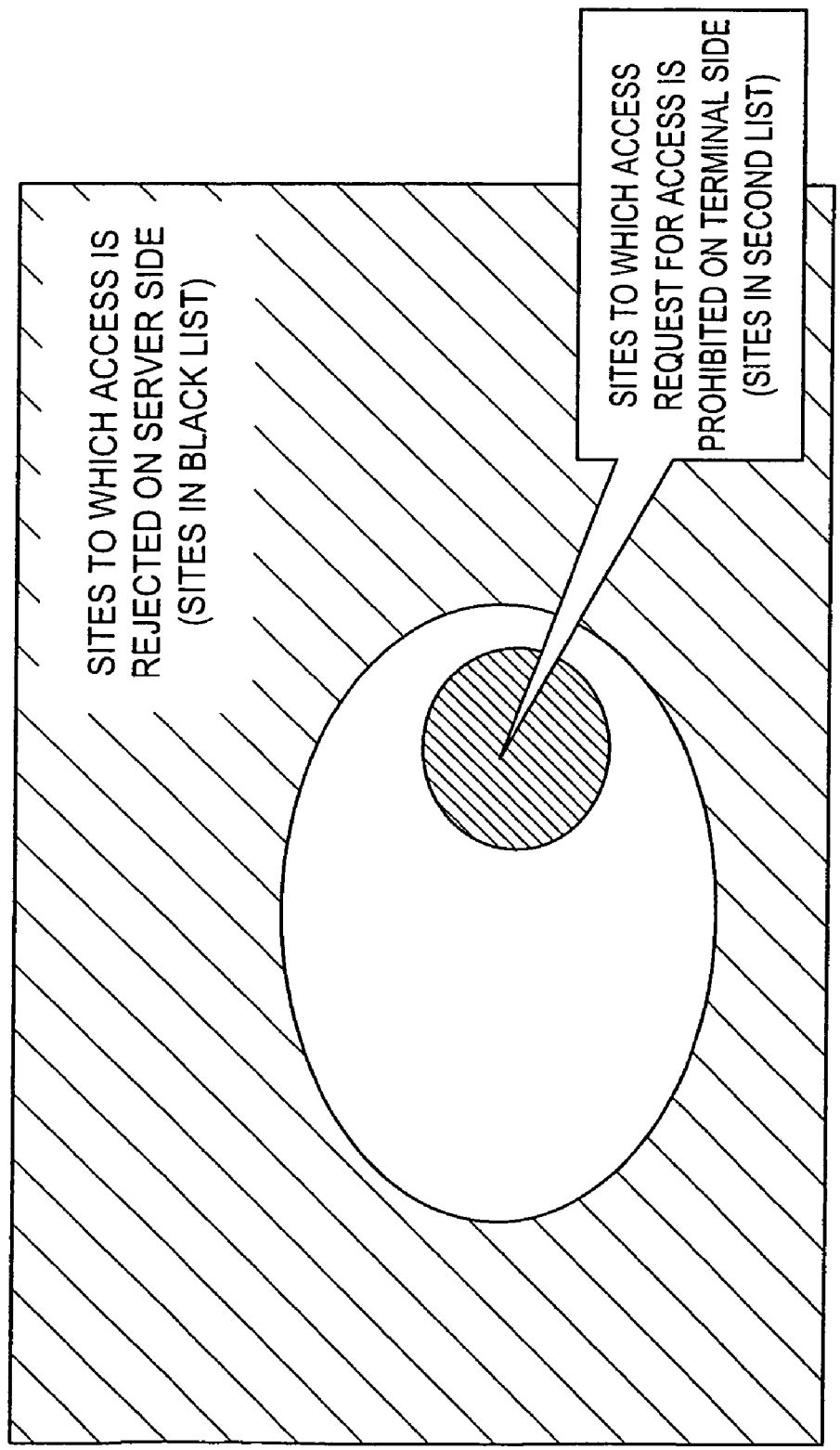
FIG. 10 is another example of sites for which an access limitation is set by a list on the terminal, and sites for which an access limitation is set on the server, in the second mode of the embodiment.

The second list held by the access request control list holder 12 of terminal 10 is a list of sites to which exceptional prohibition of access is desired, irrespective of the setting of the server 20. Such sites can be set in the second list, for example, where prohibition of access to auction sites, game sites and charged sites is desired even if these sites are among the official sites set in the white list (a setting as schematically shown in FIG. 8). Another possible case is, for example, a case where prohibition of access to chat sites is desired even if the sites are not among the black list (a setting as schematically shown in FIG. 10).

Figure 2:
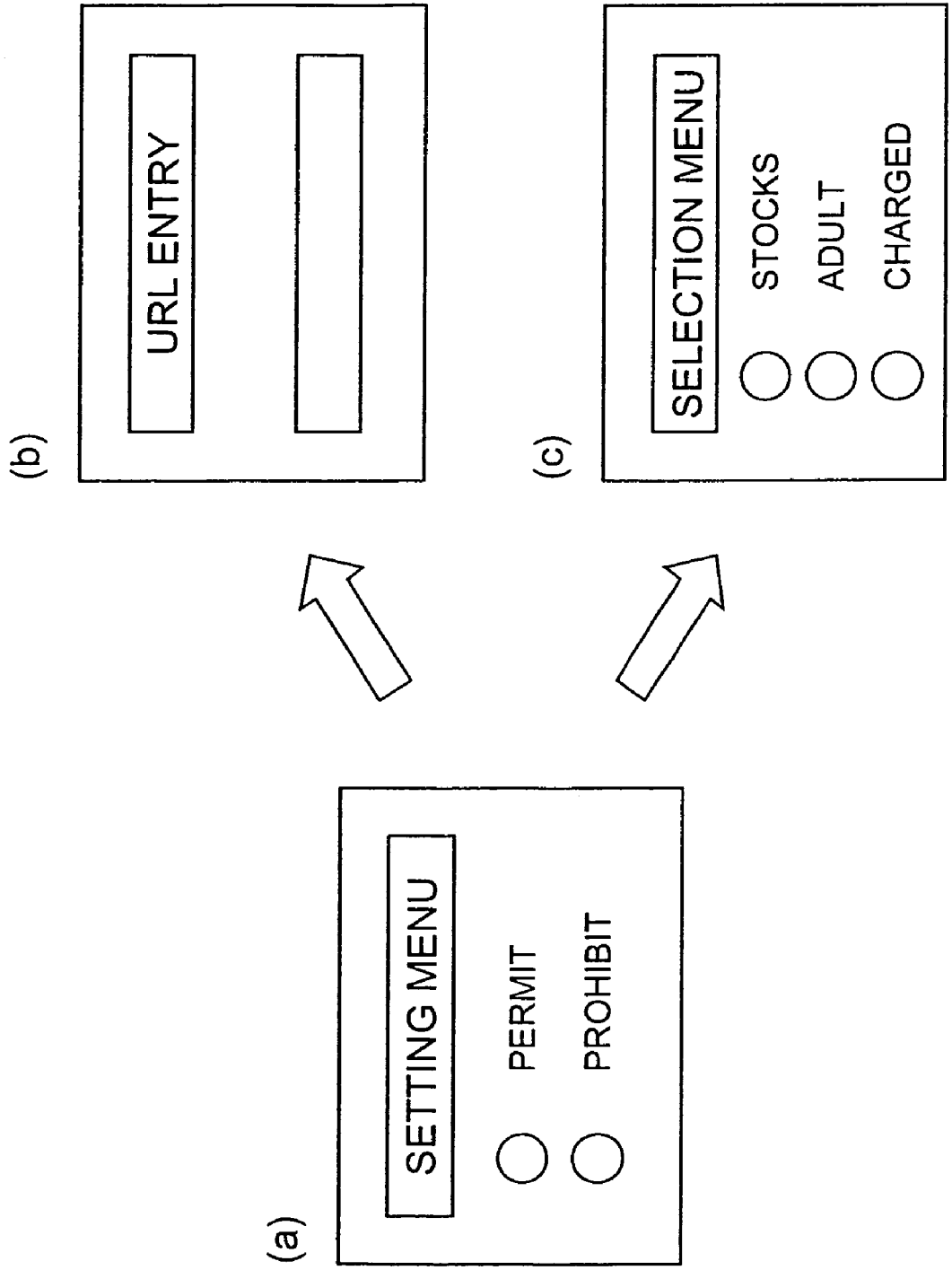
FIG. 2 is an example of interface screens for preparing a first list and a second list in an embodiment.

These exceptional settings in the terminal 10 can be implemented, for example, by software or the like with an interface screen as shown in FIG. 2, displayed on a display means (not shown) of the terminal 10. FIG. 2(a) is a screen to select exceptional permission or prohibition, and FIGS. 2(b) and (c) are screens for entering or selecting sites regarded as exceptions.

Subsequently, the processing executed by the access control system 1 in the present embodiment will be described. In the present embodiment, there are some conceivable modes, depending upon settings of the lists held by the terminal 10 and server 20. The processing will be described for each of the modes.

[First Mode]

First described is a mode as shown in FIG. 3, in which sites to which access is permitted are set on the server 20 (the access control list holder 24 in FIG. 1 holds the white list) and in which sites to which a request for access is accepted irrespective of the setting of the server 20 are set in addition to the sites listed in the foregoing white list, on the terminal 10. Let us consider herein a case where an access request is made for access to a site listed in the first list on the terminal 10 (which is a site to which a request for access is accepted irrespective of the setting of the server 20). The processing will be described below with reference to the flowcharts of FIGS. 4 and 5. In the present mode, the access request control list holder 12 of terminal 10 is assumed not to hold the second list.

First, the processing will be described with reference to the flowchart of the processing in the terminal 10 of FIG. 4. When the user of the terminal 10 performs an operation for an access request or the like, the processing is initiated. With the operation, data is generated for the access request in the terminal 10 (S01). It is assumed that this data for the access request contains information to specify a site as a target for the access request, e.g., a URL or the like.

Subsequently, in the terminal 10 the access request controller 14 retrieves the first list held in the access request control list holder 12. Then the access request controller 14 reads the information to specify the site as a target for the access request, included in the access request data, e.g., the URL, and then determines whether the URL agrees with one of the sites listed in the first list (S02). In the case of the present mode, the access request is one for access to a site listed in the first list, and a determination of agreement is made.

With the determination of agreement, the access request controller 14 adds an access permit identifier to the data of the access request (S03). A specific method of the addition is, for example, a method of defining permission in the request header field of the access request data. In HTTP (Hypertext Transfer Protocol), the general request header field is defined and, as shown in FIG. 6, the user agent field (User-Agent) therein contains the information of the user agent having made the access request. For example, there is a method of defining information such as "User-Agent: Access OK" as an access permit identifier in this field. The access permit identifier may be added using another field different from the above.

Subsequently, in the terminal 10 the access request part 16 transmits the access request data with the access permit identifier to the server 20, thereby effecting the access request (S05).

When the server 20 receives the access request from the terminal 10, the processing moves to the server 20. The processing will be described below with reference to the flowchart of the processing in the server 20 of FIG. 5.

When the access request is sent from the terminal 10 to the server 20, the access request receiver 22 in the server 20 receives the access request (S11).

Subsequently, the access controller 26 reads the access request thus received, and determines whether the access request is accompanied by the access permit identifier (S12). Specifically, for example, a determination is made by determining whether the information such as "User-Agent: Access OK" is defined in the user agent field of the access request data. Since in the present mode the access request is accompanied by the access permit identifier, a determination of permission is made.

With the determination of permission, the access controller 26 controls the access part 28 so as to make access corresponding to the access request. The access part 28 thus controlled accesses the site 30 corresponding to the access request (S14).

The site 30 thus accessed transmits data of a result corresponding to the access, to the server 20, and the access part 28 receives the access result data (S15).

Subsequently, the access part 28 delivers the access result data received, to the terminal 10 (S16).

When the access result data is transmitted from the server 20 to the terminal 10, the processing shifts again to the terminal 10. The processing will be described again with reference to the flowchart of the processing in the terminal 10 of FIG. 4.

In the terminal 10 the access request result processor 18 receives the access result data as a result of the access request (S06). Subsequently, the access request result processor 18 determines whether the received result is an access prohibit response indicating prohibition of access (S07). Since in the present mode the result is not the access prohibit response, the access request result processor 18 displays the access result data received, i.e., a content of the site corresponding to the access request, on the display means of the terminal 10 (S08).

If it is determined at S02 that the site corresponding to the access request is not included in the first list, the access request is made without addition of the access permit identifier (S05). In that case, it is determined at S12 of FIG. 5 in the processing of the server 20 that the access request is not accompanied with the access permit identifier. Thereafter, the access controller 26 of the server 20 retrieves the white list held by the access control list holder 24 and determines whether the access request is one for a site included in the white list (S13).

If the access request is determined to be one for a site included in the white list, the processes (S14-S16) are carried out in the same manner as in the case where the access request is accompanied by the access permit identifier. If the access request is determined not to be one for a site included in the white list, the access controller 26 transmits data of an access prohibit response indicating that the access request is one for access prohibited, to the terminal 10 (S17).

Figure 4:
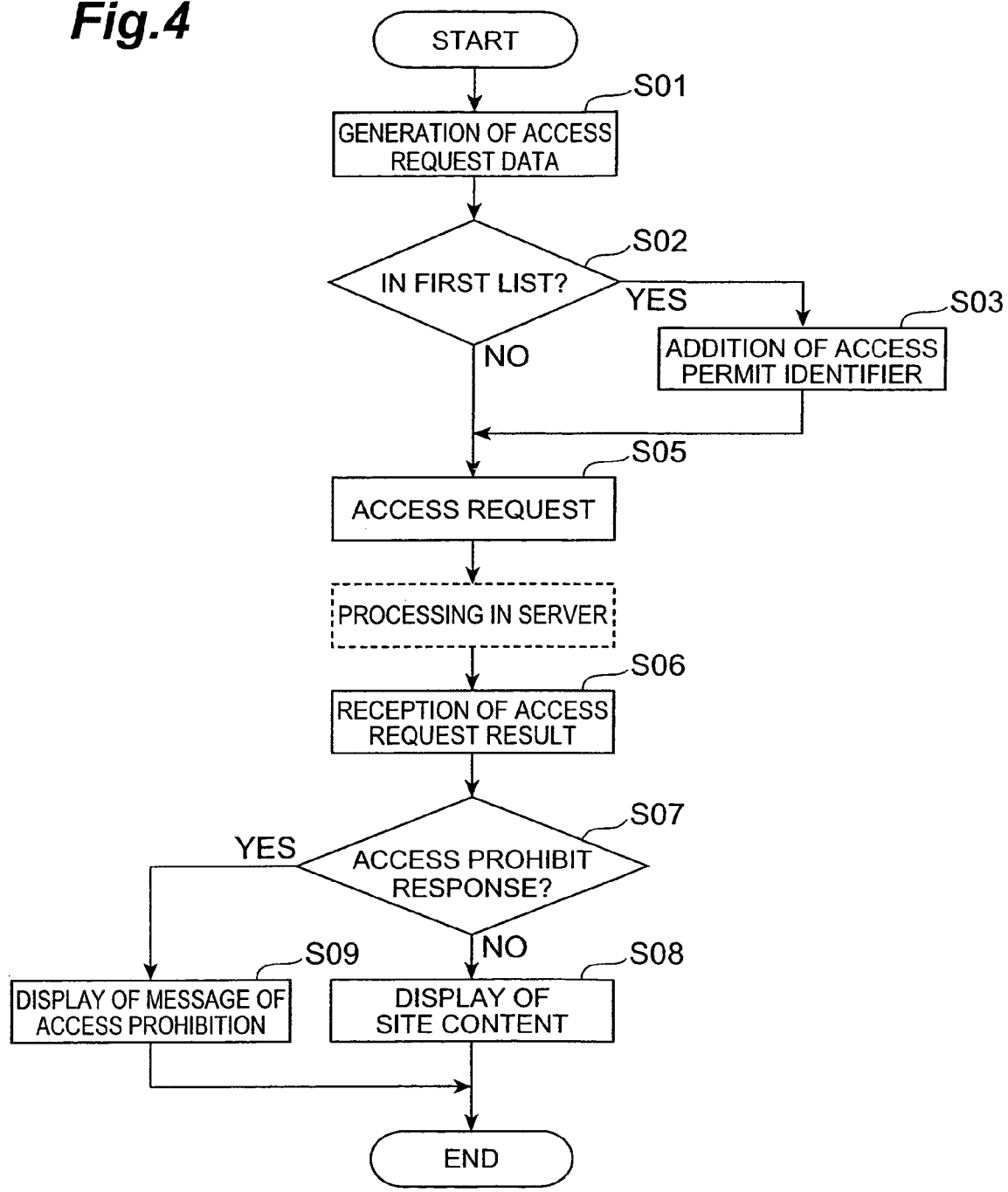
FIG. 4 is a flowchart of processing in a terminal in the first mode of the embodiment.
Figure 5:
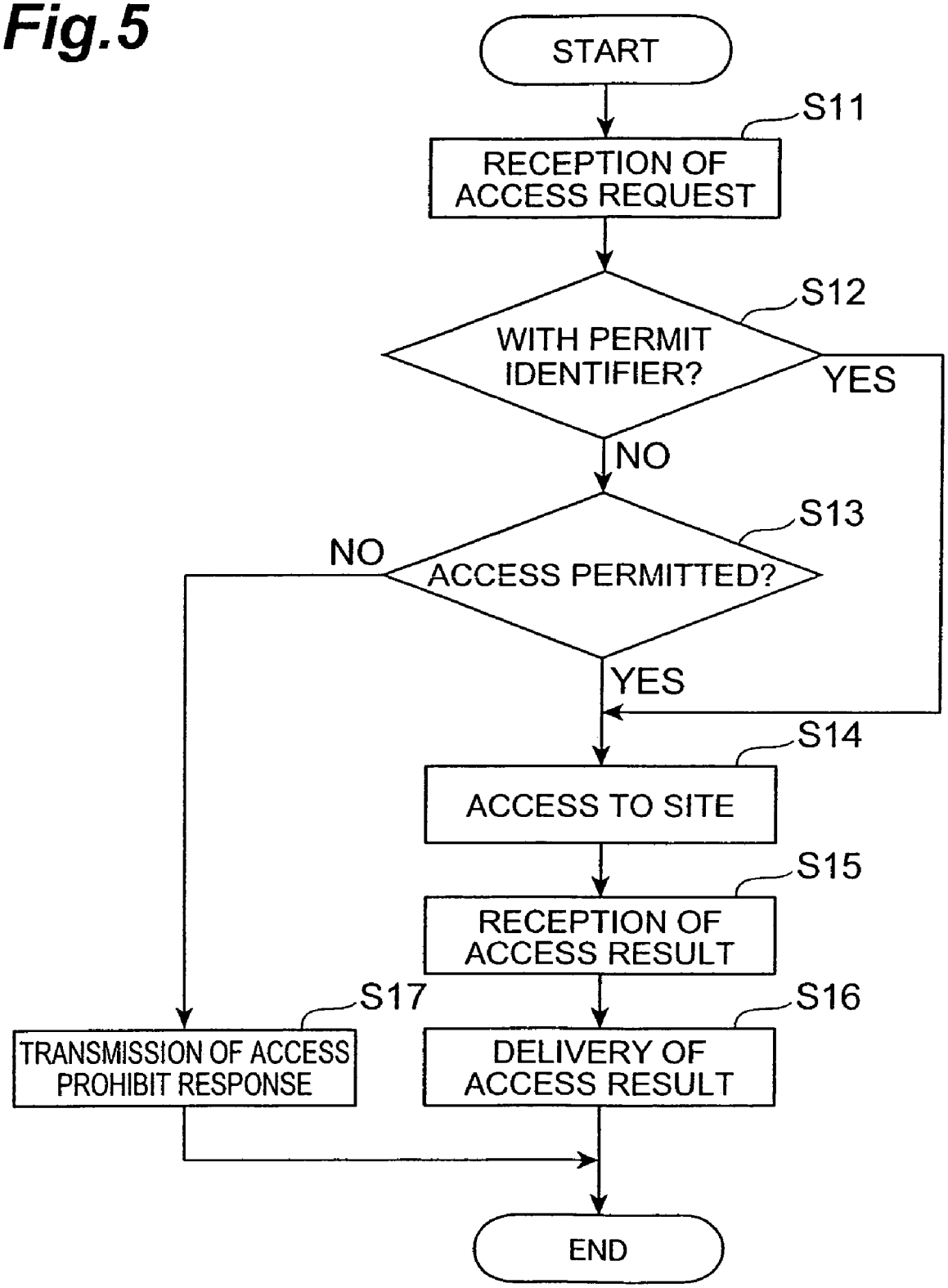
FIG. 5 is a flowchart of processing in a server in an embodiment.

In the terminal 10 to which the data of the access prohibit response was transmitted, the access request result processor 18 determines at S07 in FIG. 4 that the received result is the access prohibit response, and provides display of a message that access is prohibited, on the display means of terminal 10 (S09).

The processing in the first mode is described above, and the processing is much the same in a mode as shown in FIG. 7, in which sites to which access is rejected are set on the server 20 (the access control list holder 24 holds the black list) and in which sites to which a request for access is accepted irrespective of the setting of the server 20, on the terminal 10 are listed in the black list. The difference is that either the white list or the black list is used to determine whether access is to be permitted or rejected where the access request is not accompanied with the access permit identifier, at S13 in FIG. 5.

As described above, since the first list is held, the terminal 10 is allowed to perform the control to make the exceptional access request, regardless of the setting in the server 20.

[Second Mode]

Next, as shown in FIG. 8, a mode is described, in which sites to which access is permitted are set on the server 20 (the access control list holder 24 holds the white list) and in which sites to which an access request for access is prohibited irrespective of the setting of the server 20, on the terminal 10 are listed in the foregoing white list. Let us consider herein a case where an access request is made for access to a site listed in the second list on the terminal 10 (which is a site to which an access request for access is prohibited irrespective of the setting of the server 20). The processing will be described below with reference to the flowchart of the processing in the terminal 10 of FIG. 9. It is assumed in the present mode that the access request control list holder 12 of terminal 10 does not hold the first list.

First, the user of the terminal 10 performs an operation for an access request or the like to start the processing. With the operation, data is generated for the access request in the terminal 10 (S01). This data for the access request is assumed to contain information to specify the site as a target for the access request, e.g., a URL or the like.

Subsequently, in the terminal 10 the access request controller 14 reads the second list held in the access request control list holder 12. Then the access request controller 14 reads the information to specify the site as a target for the access request, included in the access request data, e.g., the URL, and determines whether the URL agrees with one of the sites listed in the second list (S04). Since in the case of the present mode the access request is one for access to the site listed in the second list, a determination of agreement is made.

With the determination of agreement, the access request controller 14 performs a control to prohibit the access request, over the access request part 16, and provides display of a message that access is prohibited, on the display means of the terminal 10 (S09).

When it is determined at S04 that the site corresponding to the access request is not included in the second list, the access request is sent to the server 20 (S05), and processing is performed in the same manner as in the case where the access request without the access permit identifier is sent to the server 20 in the first mode. In that case, the processing in the server 20 is such that it is determined at S12 in FIG. 5 that the access request is not accompanied by the access permit identifier. Thereafter, the access controller 26 of the server 20 reads the white list held by the access control list holder 24 and determines whether the access request is one for a site included in the white list (S13).

If the access request is determined to be one for access to a site included in the white list, the access processes (S14-16) to the site are carried out in the same manner as in the first mode. If the access request is determined not to be one for access to a site included in the white list, the access controller 26 transmits to the terminal 10 data of an access prohibit response indicating that the access request is one for access prohibited (S17).

Figure 9:
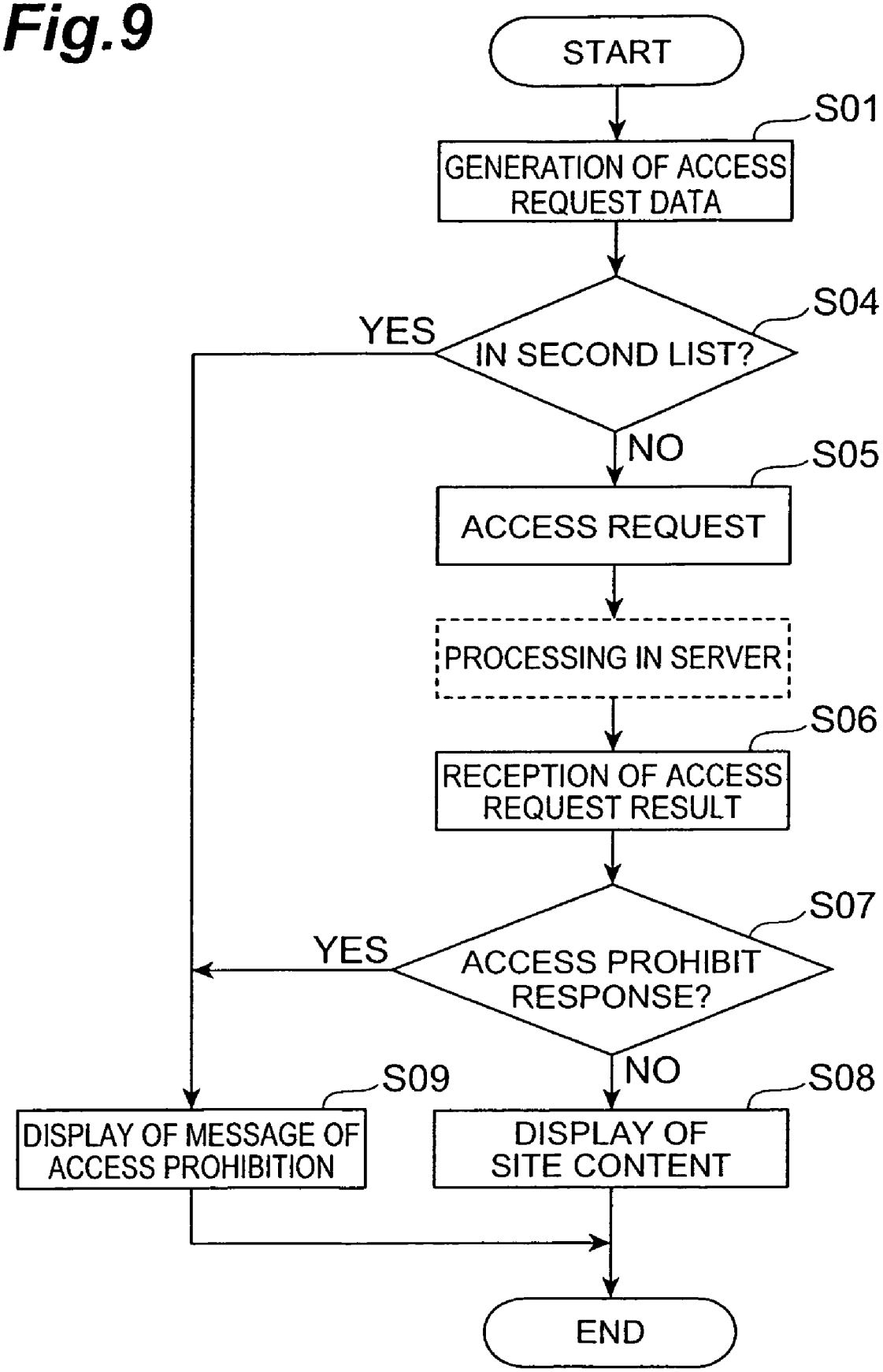
FIG. 9 is a flowchart of processing in a terminal in the second mode of the embodiment.

In the terminal 10 to which the data of the access prohibit response was transmitted, the access request result processor 18 determines that the received result is the access prohibit response at S09 in FIG. 9, and provides display of a message that access is prohibited, on the display means of terminal 10 (S09).

The processing in the second mode is described above, and the processing is much the same in a mode as shown in FIG. 10, in which sites to which access is rejected are set on the server 20 (the access control list holder 24 holds the black list) and in which sites to which the access request for access is prohibited irrespective of the setting of the server 20, on the terminal 10 are set in addition to the sites listed in the foregoing black list. The difference is that either the white list or the black list is used to determine whether access is to be permitted where the access request is not accompanied with the access permit identifier, at S13 in FIG. 5.

As described above, since the second list is held, the terminal 10 is allowed to perform the control to prohibit the exceptional access request, regardless of the setting of the server 20.

The above embodiment enables the exceptional access control to the rule uniformly set in the server 20, for each terminal 10, without need for individual setting in the server 20, and thus reduces the loads on the server 20 and the efforts of the administrator of the server 20.

In the present embodiment the access request with the access permit identifier is arranged to result in allowing access. However, since whether access is to be made is finally determined on the server 20, it is also possible to perform a control to reject access even if an access request is accompanied by an access permit identifier.

In the first and second modes described above, only one of the first list and the second list is held, but a mode where the both lists are held can be adopted.

The disclosure of Japanese Patent Application No. 2004-085391 filed Mar. 23, 2004 including specification, drawings and claims is incorporated herein by reference in its entirety.

What is claimed is:

1. A terminal for transmitting a request for a website, the terminal comprising:
   terminal data for determining whether to allow a request for access to a website;
   access request controller for determining whether to allow access to a requested website based on the terminal data and for adding an access permit identifier to a request for access to information on the requested website if it is determined by the access request controller whether to allow access to the website, the access permit identifier indicating to a server that the terminal has determined that the requested website in the request is allowed by the terminal; and
   transmitter for transmitting the request, including the access permit identifier, to the server.

2. The terminal of claim 1, wherein the terminal data comprises a list of websites to which access is allowed;
   wherein the access request controller determines if the requested website is included in the list of websites;
   wherein the list of websites comprises a list of websites to which access is allowed irrespective of any determination by the server whether to grant access; and
   wherein the access permit identifier in the request for access indicates to the server that the terminal requests access to the website regardless of any determination by the server whether to grant access.

3. The terminal of claim 2, wherein the access permit identifier in the request for access indicates to the server not to perform a determination whether to grant access to the requested website.

4. The terminal of claim 1, wherein the terminal data comprises a list of websites to which access is allowed;
   wherein the terminal data comprises a second list of websites to which access is prohibited;
   wherein the access request controller determines if the requested website is included in the second list of websites rejects access to the requested website if the access request controller determines if the requested website is included in the second list of websites.

5. A method for a terminal to transmit a request for a website, the method comprising:
   accessing terminal data for determining whether to allow a request for access to a website;
   determining whether to allow access to a requested website based on the terminal data;
   generating a request for access to the requested website if it is determined whether to allow access to the requested website, the request including an access permit identifier in the request, the access permit identifier indicating to a server that the terminal has determined that the requested website in the request is allowed by the terminal, the request requesting access to information on the requested website; and
   transmitting the request, including the access permit identifier, to the server.

6. The method of claim 5, wherein the terminal data comprises a list of websites to which access is allowed;
   wherein determining whether to allow access to a requested website on the server based on the terminal data comprises determining if the requested website is included in the list of websites;
   wherein the list of websites comprises a list of websites to which access is allowed irrespective of any determination by the server whether to grant access; and
   wherein the access permit identifier in the request for access indicates to the server that the terminal requests access to the website regardless of any determination by the server whether to grant access.

7. The terminal of claim 1, wherein the access permit identifier in the request for access indicates to the server that the terminal requests access to the website regardless of any determination by the server whether to grant access.

8. The method of claim 5, wherein the access permit identifier in the request for access indicates to the server that the terminal requests access to the website regardless of any determination by the server whether to grant access.

* * * * *